United States Patent [19]

Siu

[11] Patent Number: 4,675,973
[45] Date of Patent: Jun. 30, 1987

[54] METHOD OF MAKING A BINGO CHIP

[76] Inventor: Linus Siu-Yuen Siu, 1837 Williams Street, Vancouver, British Columbia, Canada, V5L 2R7

[21] Appl. No.: 867,037

[22] Filed: May 27, 1986

Related U.S. Application Data

[62] Division of Ser. No. 584,014, Feb. 27, 1984, abandoned.

[51] Int. Cl.$^4$ .............................................. B23P 17/00
[52] U.S. Cl. .................................. 29/527.2; 273/239; 273/269
[58] Field of Search .......................... 29/527.2; 83/914; 264/153; 40/27.5; 273/1 M, 128 R, 148 R, 239, 269, 288

[56] References Cited

U.S. PATENT DOCUMENTS 800,217  9/1905  Keplinger .
2,348,311  5/1944  Ruben .
2,798,257  7/1957  Beare .
3,766,452  10/1973  Burpee et al. .
3,983,646  10/1976  Howard .

Primary Examiner—Howard N. Goldberg
Assistant Examiner—Carl J. Arbes
Attorney, Agent, or Firm—Barrigar & Oyen

[57] ABSTRACT

A bingo chip comprises a transparent chip body having opposed faces, and a ferromagnetic ring. The ferromagnetic ring extends adjacent substantially the entire outer periphery of the chip body and is affixed between the faces therof, an outer periphery of the ring not extending beyond the outer periphery of the chip body and preferably being flush therewith. A method of making such a bingo chip comprises forming a chip body about a hole in a ferromagnetic sheet followed by trimming of the ferromagnetic sheet flush with the outer periphery of the chip body.

13 Claims, 6 Drawing Figures

U.S. Patent  Jun. 30, 1987  4,675,973
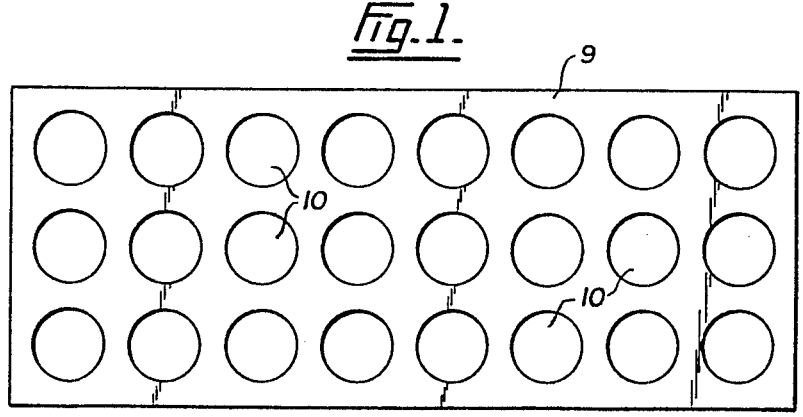
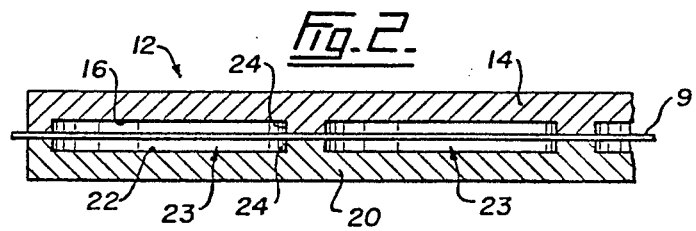
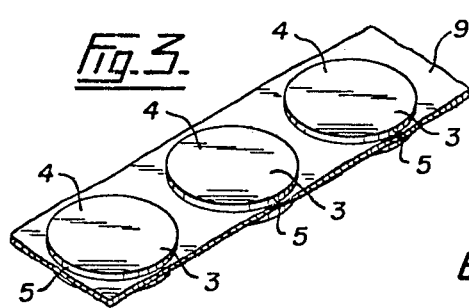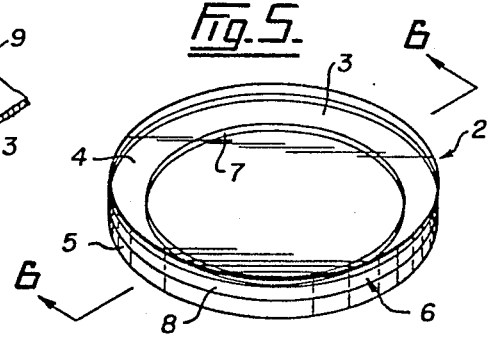
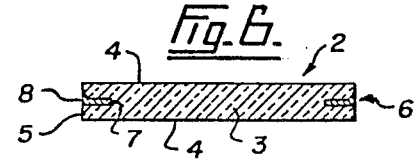
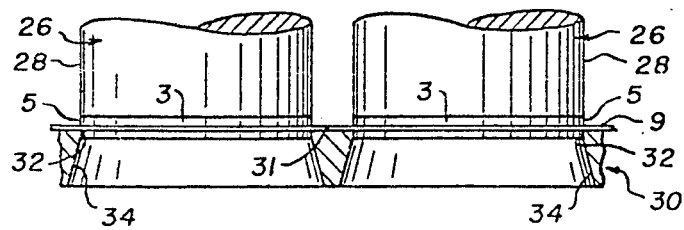

METHOD OF MAKING A BINGO CHIP

CROSS-REFERENCE TO RELATED APPLICATION

This application is a division of application Ser. No. 584,014 filed Feb. 27, 1984, now abandoned.

FIELD OF THE INVENTION

This invention relates to a bingo chip which contains a ferromagnetic ring so that the bingo chip can be attracted by a magnet to facilitate handling of such bingo chips.

DESCRIPTION OF PRIOR ART

When playing bingo, it is of course required to have a marker to mark off the called numbers on a bingo card. Preferably, the marker is transparent so that a player can double check the numbers beneath the chips. Since such chips are typically coloured for easy recognition, and they must not be too thick otherwise their overall transparency becomes significantly decreased and hence leads to difficulty in double checking called numbers. The thinness of such bingo chips leads to difficulties in handling them, particularly when a large number of chips are required, for example where a player is playing a number of cards simultaneously. A convenient way of handling such chips is to provide a ferromagnetic substance therein and a permanent magnet in the form of a wand, so that the chips will be readily attracted to such wand. When a player is playing a bingo game with such chips, which are typically circular in shape, they are placed one by one by hand over the called numbers on the card or cards in the usual manner. When the bingo game is finished and the player wishes to clear the cards he is playing, the wand is simply drawn over adjacent the surface of the cards thereby causing such chips to adhere to the wand. The chips are then readily removed from the wand by a simple stroke of the hand so as to cause them to fall into a suitable receptacle. It may be necessary to pass the wand over the cards more than once. However, all of the chips will be fairly readily removed from the cards without the necessity of picking each up one by one, which is fairly difficult bearing in mind the relative thinness of the chips.

A number of bingo chips containing a ferromagnetic element have been described in the past. For example U.S. Pat. No. 3,684,288 to Grace issued on Aug. 15, 1972 describes such a chip wherein the ferromagnetic element consists of ferromagnetic particles disposed throughout the plastic chip body. U.S. Pat. No. 4,019,747 to Chuilli issued on Apr. 26, 1977 describes a bingo chip wherein the ferromagnetic element consists of an annular ring connected to and extending beyond the outer periphery of the plastic chip body, or wherein the chip body has a central hole with the annular ring connected to the periphery of such hole and extending inward therefrom. A difficulty with the bingo chip of the Grace patent is that as the particles are spaced apart, they do not effectively conduct magnetic field between one another so that when a magnet contacts an edge of such a chip, a further edge or face of such a chip not in contact with the magnet will not effectively attract and retain another such chip thereagainst. Thus for a given size magnet, less chips can be attracted to it than would be the case if the magnetic field was conducted efficiently through the chip by the ferromagnetic element.

The bingo chip of the Chuilli patent wherein the ferromagnetic ring is attached to the outer periphery of the plastic chip body, overcomes the foregoing problem but in itself produces three new problems. First the ferromagnetic ring will tend to scratch the typically relatively soft plastic bodies of adjacent chips when the chips are together in a receptacle, thereby resulting in decreased transparency of the chips with use. In addition, particularly in the case of a player playing a larger number of cards for a substantial period of time, the ferromagnetic ring which is typically steel will contact the player's fingers repeatedly and tend to stain them black, which stain is difficult to remove. Further, the exposed edges of such ferromagnetic ring, being relatively thin, tend to be left fairly sharp by the manufacturing process so that such could injure the player's fingers. In the case of the bingo chip of the Chuilli patent wherein the ring is disposed in the central hole, there is of course no efficient conduction of the magnetic field from one part of the edge of the chip to another part of the edge thereof, and in addition the ferromagnetic ring in such a position tends to at least partially block the number on a card over which the chip is placed.

Subsequent U.S. Pat. No. 4,172,597 to Grace et al issued on Oct. 30, 1979, provides a ferromagnetic mesh or screen disposed within the chip body. Such screen assists in conducting the magnetic field from one portion of the edge of the chip to other portions thereof since the screen is continuous, although not as much as may be desired due to the relatively thin strands of the wire making up the mesh. A disadvantage of this chip though however, is the same as in the chip of the Grace '288 patent, that is that the mesh now tends to partially obscure a number of a bingo card over which the chip is disposed. U.S. Pat. No. 4,395,043 issued July 26, 1983 to Gargione returns to the concept of a ring, but attempts to overcome possible sharp edges which may be presented to a player's fingers, as well as difficulty in attaching the ring to the chip body, by providing the ring with flanges which overlie and contact adjacent portions of respective faces of the chip body. However, the ferromagnetic ring again typically of steel, will still contact a player's fingers tending again to stain them black as described after prolonged playing on a number of cards simultaneously. Further, such a chip may be relatively difficult to manufacture, the patent not describing the manufacturing technique.

U.S. Pat. No. 1,605,703 issued Nov. 2, 1926 to Brown does describe a checker with a ferromagnetic ring disposed in the body thereof. However, in such checker the ring is spaced inward from the outer periphery thereof and hence does not readily facilitate edge to edge attraction of such devices when a magnet is placed against a portion of an edge of one of them.

It would be desirable then, to provide a bingo chip with a ferromagnetic element disposed therein, which will not present a potential hazard to the fingers of a player whether through potentially sharp edges or simply through contact with the player's fingers thereby staining them black, which will allow a number on a bingo card over which the chip is placed to be readily read, and which will be fairly readily manufactured.

SUMMARY OF THE INVENTION

The present invention provides a bingo chip which comprises a transparent chip body having opposed faces, and a ferromagnetic ring. The ferromagnetic ring extends adjacent substantially the entire outer periphery of the chip body, and is affixed between the faces of the chip body. An outer periphery of the ring does not extend beyond the outer periphery of the chip body.

The outer periphery of the ferromagnetic ring is preferably flush with the outer periphery of the chip body. Further, the chip body is preferably circular and the ferromagnetic ring annular.

A method of making a bingo chip as described is also provided. The method comprises forming a transparent chip body about a hole in a ferromagnetic sheet such that the ferromagnetic sheet is affixed between opposed faces of the chip body, and substantially the entire outer periphery of the chip body extends beyond the periphery of the hole, with a portion of the ferromagnetic sheet adjacent to at least a portion of the outer periphery of the chip body being left uncovered by the chip body. Following this, the ferromagnetic sheet is then trimmed flush with the outer periphery of the chip body. Preferably, the chip body is formed such that a portion of the ferromagnetic sheet substantially surrounding the entire outer periphery of the chip body is left uncovered by the chip body.

The method preferably comprises making a plurality of chips simultaneously in the manner described.

The method may usefully additionally comprise the step of forming the holes in the ferromagnetic sheet prior to forming the chip bodies. Of course, a particular manufacturer might obtain the ferromagnetic sheet with the holes already formed therein.

The preferred method of trimming as described, is performed by punching the ferromagnetic sheet flush with the outer peripheries of the chip bodies.

The ferromagnetic sheet may be of a variety of shapes, although rectangular is preferred.

DRAWINGS

Embodiments of the invention will now be described with reference to the drawings in which:

FIG. 1 is a plan view of a ferromagnetic sheet with holes therein used in the making of chips of the present invention;

FIG. 2 is a vertical cross-section along a portion of a mold shown forming the chip bodies about the ferromagnetic sheet of FIG. 1;

FIG. 3 is a perspective view of a portion of the ferromagnetic sheet with the formed chip bodies thereon;

FIG. 4 is a vertical cross section of a punch and die apparatus being utilized to produce chips of the present invention from the sheet of FIG. 3;

FIG. 5 is a perspective view of a chip of the present invention produced from the punch and die shown in FIG. 4; and FIG. 6 is a vertical cross section along the line 6—6 of FIG. 5.

DETAILED DESCRIPTION OF THE EMBODIMENTS OF THE INVENTION

Referring first to FIG. 5, a bingo chip 2 of the present invention is shown. The chip consists of a circular transparent, usually coloured, plastic chip body 3 with an outer edge or periphery 5. An annular ferromagnetic ring 6, typically made of soft steel, extends around the outer periphery 5 of chip body 3, and is fixed between opposite faces 4 of chip body 3 by being embedded within chip body 3. Ring 6 has an inner edge or periphery 7, and an outer edge or periphery 8, the outer periphery 8 being flush with outer periphery 5 of chip body 3.

The method of making the bingo chip 2 as shown in FIGS. 5 and 6, will now be described with reference to FIGS. 1 through 4, the sequence of steps proceeding in numerical order through those figures. First, a plurality of circular holes 10 are formed in sheet 9, typically by punching out holes 10 therefrom. Sheet 9 is then positioned by suitable stops (not shown) between opposed half sections 14 and 20 of a mold 12. Half sections 14 and 20 are provided with mating circular cavities 16 and 22 respectively, which together define circular mold cavities 23. Sheet 9 is disposed with the centres of holes 10 being disposed in the centres of mold cavities 23 such that the outer edge or outer periphery 24 of each mold cavity 23 extends beyond the periphery of each corresponding hole 10. Suitable means (not shown) for injecting a suitable transparent, coloured plastic to form chip body 3, are provided. Following forming of chip bodies 3 in mold 12, and removal of mold 12, sheet 9 is left with a plurality of spaced apart chip bodies formed thereon. As shown in FIG. 3, sheet 9 will now be affixed or embedded between opposed faces 4 of each chip body 3. Of course, as mold cavities 23 are spaced apart, there will be portions of sheet 9 which surround the entire outer periphery 5 of each chip body and which are left uncovered by the chip bodies 3.

Chip bodies 3 with sheet 9 embedded therein, are now positioned in a punch and die arrangement as shown in FIG. 4. A plurality of cylindrical punches 26 are provided which may be connected to a common upper platen (not shown). Punches 26 have diameters the same as respective chip bodies 3 so that outer peripheries 28 of punches 26 are aligned with outer peripheries 5 of chip bodies 3. In addition the punch and die arrangement includes a lower platen 30 which has circular holes 32 of a diameter substantially the same as chip bodies 3, so that lower portions of chip bodies 3 will rest within holes 32 with the outer peripheries 5 of chip bodies 3 being substantially flush with the surface of holes 32, and sheet 9 resting on an upper surface 31 of lower platen 30. Lower platen 30 is also provided with diverging openings 34 communicating with openings 32. Pressing punches 26 downward causes sheet 9 to be punched off flush adjacent the outer peripheries 5 of chip bodies 3, thereby resulting in bingo chips 2 which will then fall through openings 32 and flared openings 34. The outer periphery 8 of each ring becomes slightly bent as shown most clearly in FIG. 6, as a result of the foregoing punching step. As a result the outer periphery may extend a very small amount beyond the outer periphery 5 of the chip body 3, which small amount might be visible upon a very close examination of the chip. It will be understood that such very small amount is within contemplation when the word "flush" is used.

It will be appreciated that die platen described above can be replaced by a known type of die platen which includes spring loaded cylinders disposed beneath the upper openings of such platens, so that when punches 26 are drawn upward following punching of sheet 9, formed bingo chips 2 are then ejected by such spring loaded cylinders.

When bingo chips 2 are in use, as the metal rings 6 do not contact a player's fingers, such will not be stained by those chips 2. In addition, there is little likelihood of exposed metal edges which could cut a player's fingers, or cause scratching of adjacent chips 2 when such are stored in a common container. The continuous ferromagnetic ring 6 will of course assist in conducting a magnetic field around the outer periphery of the chip body, so that an edge of one chip 2 adjacent a magnet, can adhere to an outer periphery of an adjacent chip 2.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

I claim:

1. A method of making a bingo chip, comprising:
   (a) forming a transparent chip body about a hole in a ferromagnetic sheet such that the ferromagnetic sheet is affixed between opposed faces of the chip body, and substantially the entire outer periphery of the chip body extends beyond the periphery of the hole, with a portion of the ferromagnetic sheet adjacent to at least a portion of the outer periphery of the chip body being left uncovered thereby;
   (b) trimming the ferromagnetic sheet flush with the outer periphery of the chip body.

2. A method as described in claim 1 wherein the chip body is formed such that a portion of the ferromagnetic sheet substantially surrounding the entire outer periphery of the chip body is left uncovered thereby.

3. A method as described in claim 2 wherein the chip body is formed circular in shape and about a hole which is circular.

4. A method of making bingo chips, comprising:
   (a) forming a plurality of spaced apart transparent chip bodies about respective spaced apart holes in a ferromagnetic sheet such that the ferromagnetic sheet is affixed between opposed faces of each chip body, and substantially the entire outer peripheries of the chip bodies extend beyond the peripheries of respective holes, with portions of the ferromagnetic sheet substantially surrounding the entire outer peripheries of respective chip bodies being left uncovered by the chip bodies;
   (b) trimming the ferromagnetic sheet flush with the outer peripheries of the chip bodies.

5. A method as described in claim 4 wherein the chip bodies are formed circular in shape and about respective holes which are circular.

6. A method as described in claim 4 additionally comprising forming the holes in the ferromagnetic sheet prior to forming the chip bodies.

7. A method as described in claim 5 additionally comprising forming the holes in the ferromagnetic sheet prior to forming the chip bodies.

8. A method as described in claim 4 wherein the trimming step is performed by punching the ferromagnetic sheet flush with the outer peripheries of the chip bodies.

9. A method as described in claim 5 wherein the trimming step is performed by punching the ferromagnetic sheet flush with the outer peripheries of the chip bodies.

10. A method as described in claim 8 wherein the trimming step is performed by punching the ferromagnetic sheet flush with the outer peripheries of the chip bodies.

11. A method as described in claim 4 wherein the chip bodies are formed about holes in a ferromagnetic sheet which is rectangular in shape.

12. A method as described in claim 5 wherein the chip bodies are formed about holes in a ferromagnetic sheet which is rectangular in shape.

13. A method as described in claim 9 wherein the chip bodies are formed about holes in a ferromagnetic sheet which is rectangular in shape.

* * * * *